US007223935B2

United States Patent
Wessner

(10) Patent No.: US 7,223,935 B2
(45) Date of Patent: May 29, 2007

(54) LASER PROCESSING HEAD

(75) Inventor: Michael Wessner, Gerlingen (DE)

(73) Assignee: Trumpf Werkzeugmaschinen GmbH & Co. KG, Ditzingen (DE)

( * ) Notice: Subject to any disclaimer, the term of this patent is extended or adjusted under 35 U.S.C. 154(b) by 0 days.

(21) Appl. No.: 10/800,007

(22) Filed: Mar. 15, 2004

(65) Prior Publication Data

US 2005/0109745 A1 May 26, 2005

(30) Foreign Application Priority Data

Mar. 15, 2003 (DE) ................................ 030 05 463
Mar. 15, 2003 (EP) ................................ 03005463

(51) Int. Cl.
 *B23K 26/20* (2006.01)
 *B23K 26/14* (2006.01)
 *B23K 26/38* (2006.01)

(52) U.S. Cl. ........................... 219/121.64; 219/121.72; 219/121.84

(58) Field of Classification Search ........... 219/121.84, 219/121.63, 121.67, 121.64, 121.72
See application file for complete search history.

(56) References Cited

U.S. PATENT DOCUMENTS 5,308,951 A * 5/1994 Mori ..................... 219/121.84
5,418,350 A * 5/1995 Freneaux et al. ....... 219/121.84

FOREIGN PATENT DOCUMENTS

| DE | 38 22 097 | | 1/1990 |
|----|-----------|---|--------|
| EP | 0 411 535 | | 2/1991 |
| GB | 2163692   | | 3/1986 |
| JP | 60-108191 | | 6/1985 |
| JP | 9-220687  | | 8/1997 |
| JP | 11-141822 | A * | 5/1999 |
| JP | 11-239889 | | 7/1999 |

* cited by examiner

*Primary Examiner*—Geoffrey S. Evans
(74) *Attorney, Agent, or Firm*—Fish & Richardson P.C.

(57) ABSTRACT

A nozzle of a laser processing head for laser cutting and laser welding includes a laser beam outlet for directing a laser beam towards a processing location of a workpiece to be processed, a first gas supply channel for supplying a cutting gas towards the processing location of a workpiece to be processed when the laser processing head is used for laser cutting, and a second gas supply channel for supplying a welding gas towards the processing location of a workpiece to be processed; when the laser processing head is used for laser welding.

14 Claims, 3 Drawing Sheets

LASER PROCESSING HEAD

CLAIM OF PRIORITY

This application claims priority under 35 USC §119 to European Patent Application Serial No. 03005463, filed on Mar. 15, 2003, the entire contents of which are hereby incorporated by reference.

TECHNICAL FIELD

This invention relates to laser cutting and laser welding and, in particular, to a laser processing head.

BACKGROUND

In a laser processing system, a laser processing head forms the end of a beam guidance from the laser to the processing location and focuses the laser beam onto the processing location. Laser processing heads contain supplies for working and/or inert gases, and sensors for distance control from the workpiece. The gases are discharged through a nozzle in the laser processing head towards the processing location on the workpiece. Often a laser cutting gas pressure of up to 20 bar is required for laser cutting to discharge the slag from the kerf.

For a laser power of up to approximately 5 kW, a pressure chamber exists in the cutting head through which the laser beam passes and which is sealed by a focusing lens. The cutting of different sheet thicknesses and materials requires different nozzle cross-sections and bores in the nozzle, as disclosed, for example, in German patent No. DE 3037981.

As an alternative to cutting heads with lens optics, cutting heads with mirror optics also have been used. To generate pressure, so-called annular gap nozzles are thereby generally used, which have a separate pressure chamber and which are disclosed, for example in European Patent Applications Nos. EP 0741627 A1 and EP 0989921 A1.

Mirror optics are used almost exclusively for laser welding due to the greater power and smaller gas pressures that are used with mirror optics. Moreover, mirror optics are less sensitive to soiling than lens optics, because laser welding tends to produce more soiling than laser cutting, and because mirror optics can be cooled directly.

Generally when the laser power is low, the gas is supplied concentrically to the processing location, and when the laser power is higher, it is supplied from the side.

Laser processing heads often must be slim due to the three-dimensional tasks they perform and to minimize the disturbing (abutting) contour of the head.

To render the machines more flexible, a universally usable processing head is desired that requires as little manual adjustment as possible, i.e., the following adjustments are eliminated: changing of the processing head when switching between laser cutting and laser welding; changing the nozzle to adjust for different materials and material thicknesses; and adjustment of the separation between workpiece and processing head to the respective processing task. These changes are conventionally realized in most cases through mechanical adjustment, pivoting and tilting mechanisms, through beam setting points or through changing stations, where the processing head or the nozzle are replaced as describe, for example, in European Patent No. EP 0411535.

SUMMARY

A compact laser processing head is disclosed that can be adjusted to different processing tasks in a quick, simple and largely automatic fashion, and is also easy to produce.

In a first general aspect, a nozzle of a laser processing head for laser cutting and laser welding includes a laser beam outlet for directing a laser beam towards a processing location of a workpiece to be processed, a first gas supply channel for supplying a cutting gas towards the processing location of a workpiece to be processed when the laser processing head is used for laser cutting, and a second gas supply channel for supplying a welding gas towards the processing location of a workpiece to be processed when the laser processing head is used for laser welding.

The nozzle can include one or more of the following features. For example, the nozzle can include an inner sleeve though which the laser beam passes and an outer sleeve surrounding the inner sleeve, where a first cavity is formed between the inner sleeve and the outer sleeve and wherein the outer sleeve includes a second cavity arranged concentrically with the first cavity. The first cavity can be formed by a first annular gap between the inner sleeve and the outer sleeve and where the second cavity is formed by a second annular gap formed in the outer sleeve. The first cavity can be formed by an annular channel from which a bore extends to a side of the nozzle. The second cavity can be formed by an annular channel from which a bore extends to a side of the nozzle. The first annular gap can merge into the first gas supply channel and the second annular gap can merge into the second gas supply channel.

The nozzle can further include a channel for supplying a stream of pressurized gas into the laser processing head in a direction perpendicular to a direction of the laser beam. The nozzle can further include a mirror for reflecting the laser beam towards the processing location of a workpiece to be processed. The mirror can be a parabolic focusing mirror. The stream of pressurized gas can be supplied into the processing head between the mirror and the laser beam outlet.

In another general aspect, a method for laser processing of a workpiece includes directing a laser beam through a processing nozzle of a laser processing head to a processing location of a workpiece, supplying a cutting gas towards the processing location through a first gas supply channel of the nozzle when the laser processing head is used for laser cutting and supplying a welding gas towards the processing location through a second gas supply channel of the nozzle when the laser processing head is used for laser cutting, and supplying a stream of pressurized gas in a direction substantially perpendicular to the direction of the laser beam.

The method can include one or more of the following features. For example, the cutting gas and the welding gas are supplied concentrically around the laser beam. The laser beam can be a $CO_2$ laser beam.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
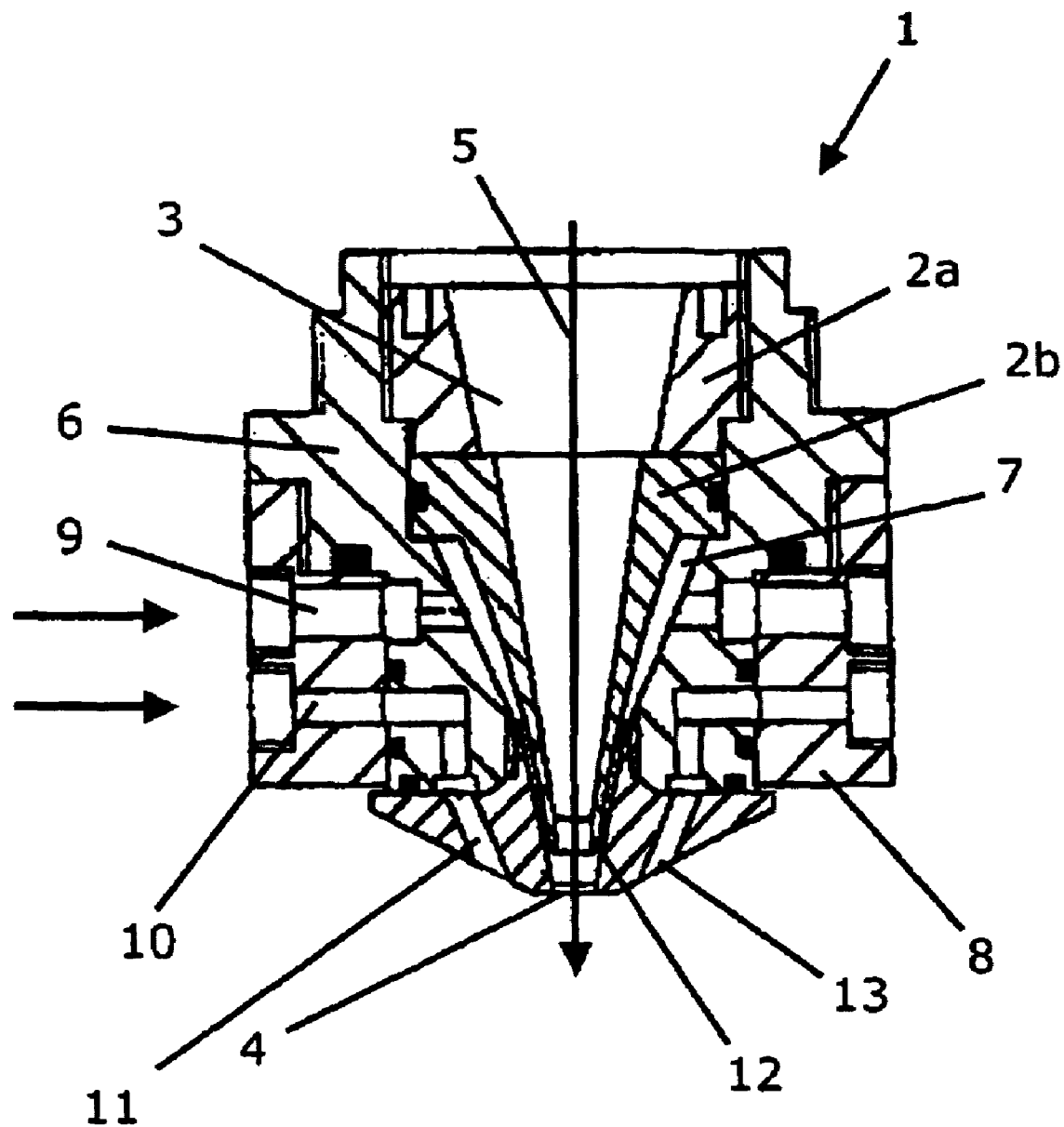
FIG. 1 is a side sectional view through a nozzle arrangement of a laser processing head.

FIG. 1 shows a processing nozzle 1 of a laser processing head of a laser-processing machine for guiding a laser beam 5 (e.g., a $CO_2$ laser beam) and two gases in the direction of the workpiece to be processed. The laser processing head can be used for laser welding as well as for laser cutting tasks. This is realized through the construction of the processing nozzle 1 provided at the tip of the laser processing head. The processing nozzle 1 permits supply of process gas for laser welding as well as cutting gas for laser cutting. The gases are supplied coaxially. Depending on the selected laser processing, a cutting gas or alternatively a working gas/inert gas can be blown in by a control unit (not shown) and associated means such as valves, sensors, pressure controllers etc. For laser cutting, processing is assisted through adding a cutting gas such as oxygen, nitrogen, argon, or air by removing the molten mass from the kerf with or without accompanying oxidation. In laser welding, a process gas such as argon, helium, nitrogen or carbon dioxide is generally used for protecting the welding seam or to support the welding process.

The processing nozzle 1 includes a pressure element 2a and a conical inner sleeve 2b that define a beam-guiding chamber 3 via an opening. The laser beam 5 can exit through an outlet 4 and be focused on the workpiece. An outer sleeve 6 is disposed concentrically with the pressure element 2a and the inner sleeve 2b, wherein an annular gap 7 is defined through arrangement of inner sleeve 2b and outer sleeve 6. The annular gap 7 merges into a first supply channel 9 for supplying cutting gas. A connecting body 8 is disposed on the outer sleeve 6 concentrically thereto. A second supply channel 10 for supplying a welding gas is formed in the connecting body 8 and merges into a second annular gap 11 that extends almost concentrically with the annular gap 7. Depending on the processing task, one or the other type of gas supply can optionally be selected such that either cutting gas is discharged from the gap opening 12 or welding gas is discharged from the channel opening 13. A control unit (not shown) controls whether cutting gas or welding gas is supplied to the processing nozzle 1.

The use of one single processing nozzle 1 and control of the gas supply eliminates the need to change nozzles in many cases, rendering laser processing more flexible. The combination or integration of both laser processing variants in one processing head eliminates the provision and use of mechanical pivoting and tilting mechanisms for changing processing heads and nozzles, because switching between laser cutting and laser processing is realized by means of a control unit through one single processing head. In addition thereto, the disturbing contour of the processing head 1 is small.

An alternative to the second annular gap 11 is an annular channel, disposed concentrically about the annular gap 7 and from which bores extend to the side of the nozzle facing the workpiece.

Figure 2:
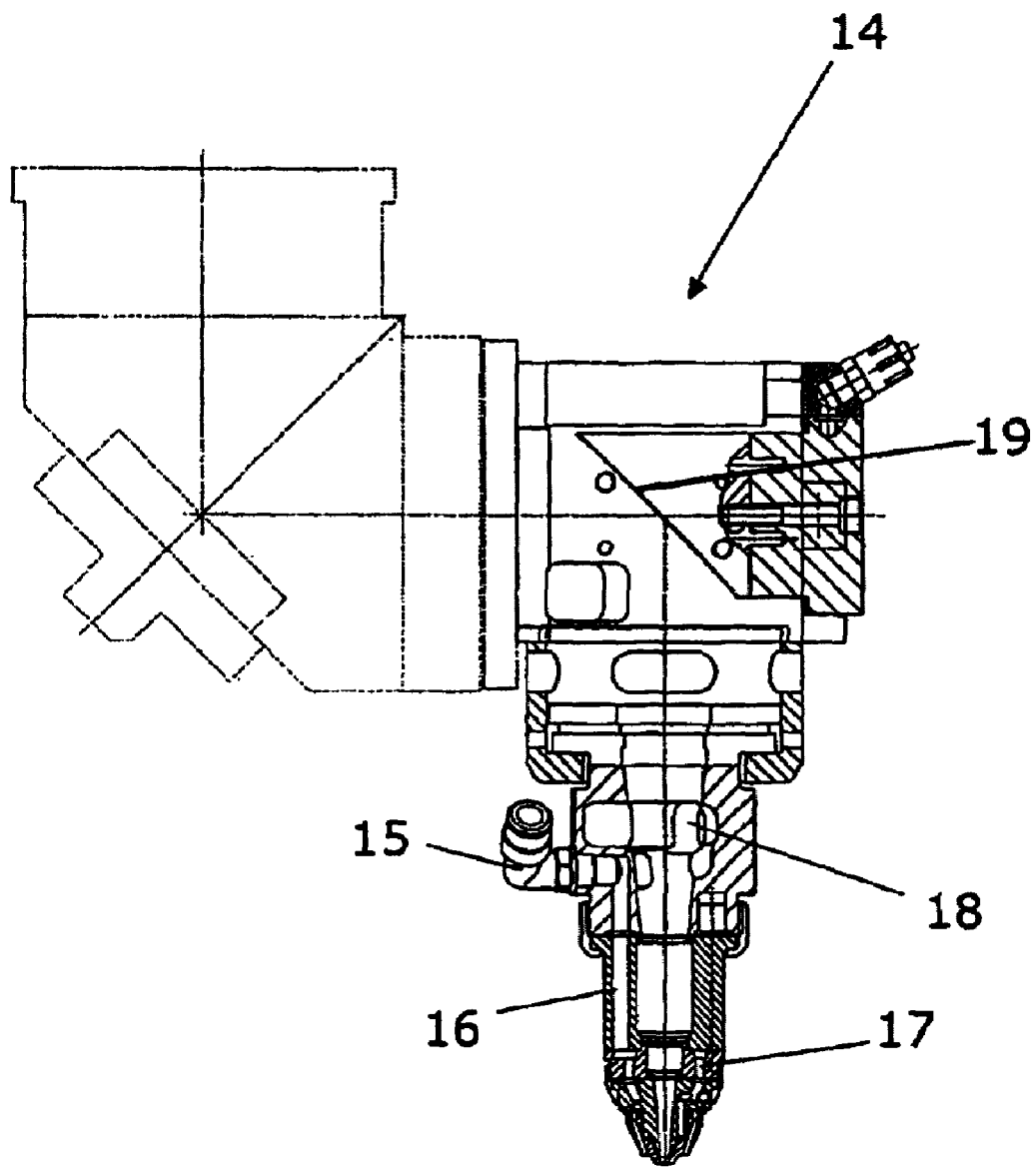
FIG. 2 is a side sectional view through a laser processing head.
Figure 3:
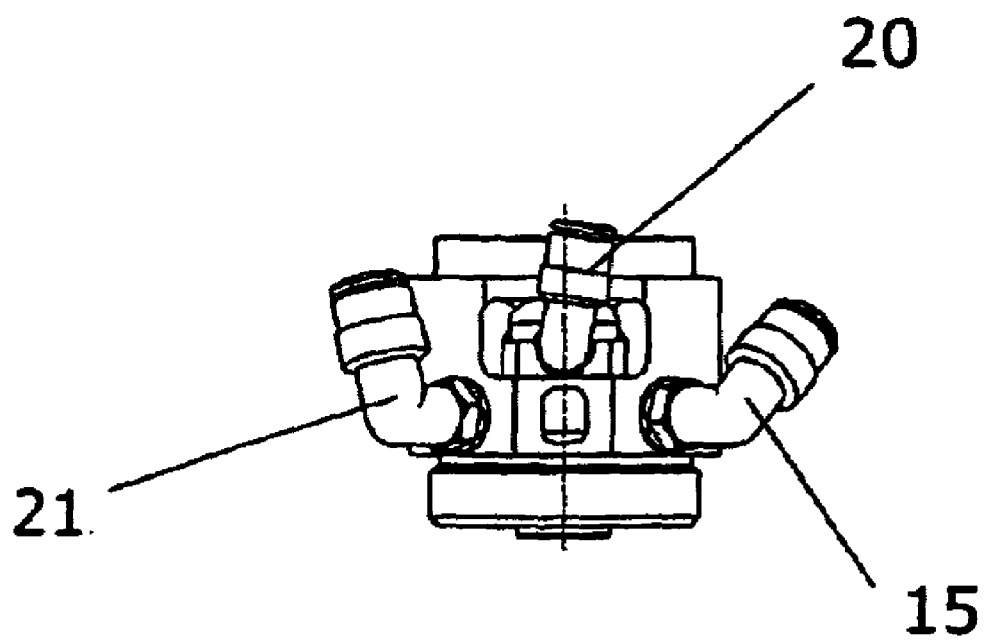
FIG. 3 is a side view showing gas supplies of the laser processing head.

As shown in FIGS. 2 and 3, a parabolic, water-cooled copper mirror 19 is integrated as a focusing element in the laser processing head 14. The focusing position is adjusted through an adaptive copper mirror that is disposed in front of the processing head 14. This is possible also manually through a displacement mechanism of the nozzle and simultaneous adjustment of the distance between the nozzle and the workpiece.

The focusing mirror is protected from process splashes by a stream of pressurized air (a "crossjet") that is blown into the processing head 14 perpendicular to the beam direction though a supply channel 18 or 20. Moreover, the crossjet has the task of protecting the beam guidance from returning gas to prevent inflation of a bellows component of the processing head 14 and to avoid negative influence on the laser beam.

The processing head includes a capacitive distance control. The distance between processing nozzle 1 and workpiece can be programmed and controlled during cutting and also during welding.

In accordance with FIG. 2, a laser processing head 14 for laser welding and for laser cutting has a processing nozzle with a first bore 16 for supply of a welding gas and a second bore 17 for supply of a cutting gas. The welding gas can flow into the bore 16 through the supply 15. FIG. 2 shows, by way of example, the integration of the welding gas and cutting gas supplies in a laser processing head 14. A crossjet 18 protects the beam guidance from returning gas.

FIG. 3 shows a three-dimensional view of the gas supply 15 for the welding gas, the gas supply 21 for the cutting gas and the gas supply 20 for the pressurized air of the crossjet 18.

OTHER EMBODIMENTS

A number of implementations have been described. Nevertheless, it will be understood that various modifications may be made. Accordingly, other implementations are within the scope of the following claims.

What is claimed is:

1. A method for laser processing of a workpiece, the method comprising:

directing a laser beam through an inner sleeve of a processing nozzle of a laser processing head to a processing location of a workpiece;

supplying a cutting gas towards the processing location through a first gas supply channel of the nozzle and through a first annular cavity defined between the inner sleeve and an outer sleeve that surrounds the inner sleeve when the laser processing head is used for laser cutting; and supplying a welding gas towards the processing location through a second gas supply channel of the nozzle and through a second annular cavity defined within the outer sleeve and being essentially concentric with the first cavity when the laser processing head is used for laser cutting.

2. The method of claim 1, wherein the cutting gas and the welding gas are supplied concentrically around the laser beam.

3. The method of claim 1, wherein the laser beam is a $CO_2$ laser beam.

4. The method of claim 1, further comprising supplying a stream of pressurized gas in a direction substantially perpendicular to the direction of the laser beam.

5. The method of claim 1, further comprising:

fluidly coupling the first cavity to the first gas supply channel, and fluidly coupling the outer sleeve to the second gas supply channel.

6. The method of claim 1, further comprising:
forming the first cavity by forming a first annular gap between the inner sleeve and the outer sleeve, and forming the second cavity by forming a second annular gap in the outer sleeve.

7. The method of claim 6, wherein:
forming the first annular gap includes merging the first annular gap into the first gas supply channel, and
forming the second annular gap includes merging the second annular gap into the second gas supply channel.

8. The method of claim 1, further comprising forming the first cavity by forming an annular channel from which a bore extends to a side of the nozzle.

9. The method of claim 1, further comprising forming the second cavity by forming an annular channel from which a bore extends to a side of the nozzle.

10. The method of claim 1, further comprising reflecting the laser beam towards the processing location of a workpiece to be processed with a mirror.

11. The method of claim 10, wherein the mirror is a parabolic focusing mirror.

12. The method of claim 1, further comprising:
reflecting the laser beam towards the processing location of a workpiece to be processed with a mirror; and
supplying a stream of pressurized gas into the laser processing head in a direction perpendicular to a direction of the laser beam, wherein the stream of pressurized gas is supplied into the processing head between the mirror and the laser beam outlet and through a channel.

13. The method of claim 1, further comprising defining a beam guiding chamber in the inner sleeve that opens into an outlet, and fluidly coupling the first cavity to the outlet.

14. The method of claim 1, further comprising defining the second annular cavity within the outer sleeve.

* * * * *

UNITED STATES PATENT AND TRADEMARK OFFICE
CERTIFICATE OF CORRECTION

PATENT NO. : 7,223,935 B2 Page 1 of 1
APPLICATION NO. : 10/800007
DATED : May 29, 2007
INVENTOR(S) : Michael Wessner It is certified that error appears in the above-identified patent and that said Letters Patent is hereby corrected as shown below:

On the Title Page, under "Foreign Application Priority Data", please delete

"Mar. 15, 2003 (DE) ………………………………..030 05 463"

Signed and Sealed this

Eighth Day of July, 2008

JON W. DUDAS
*Director of the United States Patent and Trademark Office*